Feb. 15, 1966     W. D. CHRISTIAN ETAL     3,234,728
ZERO-GRAVITY PROPELLANT FEED SYSTEM
Filed Feb. 8, 1963     4 Sheets-Sheet 1

INVENTORS
WILLIAM D. CHRISTIAN
GLENN D. NESHEIM
BY Edwin Coates
ATTORNEY

Feb. 15, 1966  W. D. CHRISTIAN ETAL  3,234,728
ZERO-GRAVITY PROPELLANT FEED SYSTEM
Filed Feb. 8, 1963  4 Sheets-Sheet 2
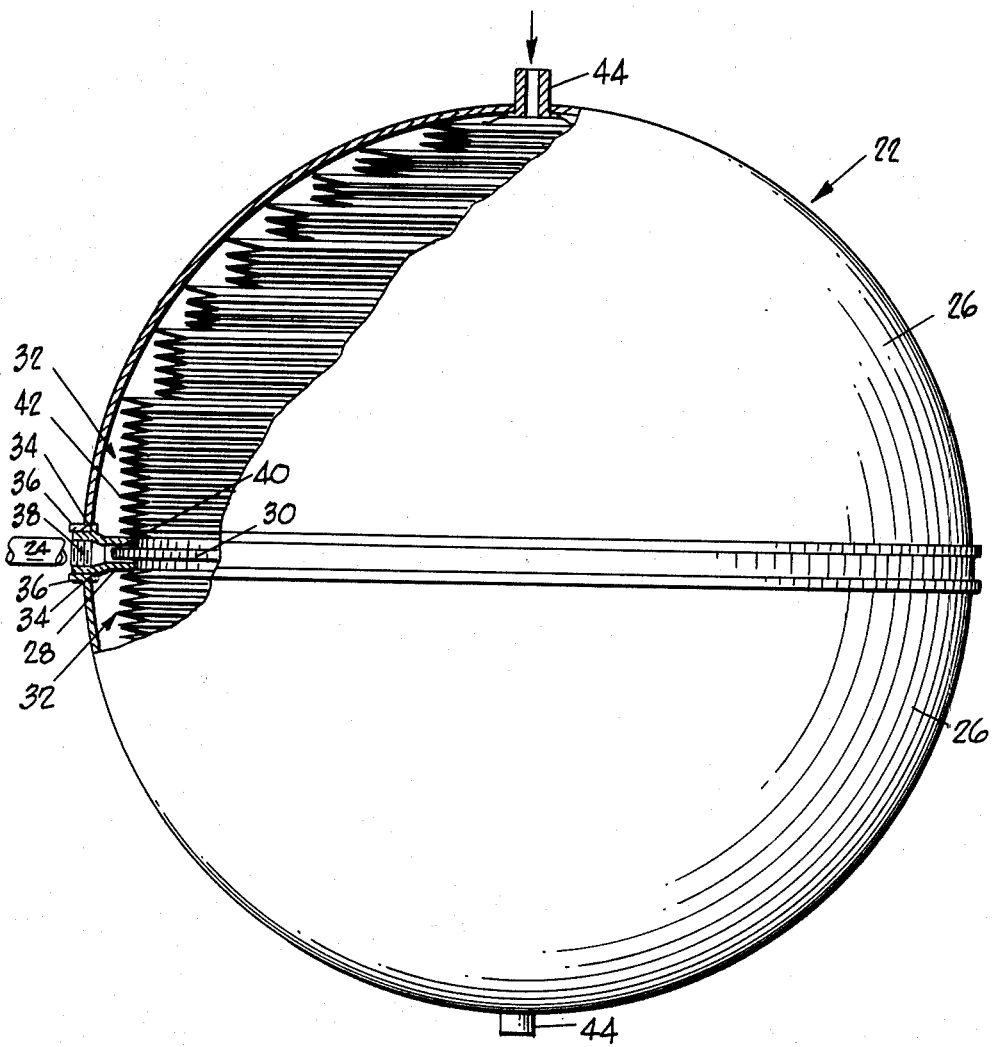
_Fig. 2_
INVENTORS
WILLIAM D. CHRISTIAN
GLENN D. NESHEIM
BY Jadwin Coates
ATTORNEY INVENTORS
WILLIAM D. CHRISTIAN
GLENN D. NESHEIM
BY Edwin Coates
ATTORNEY

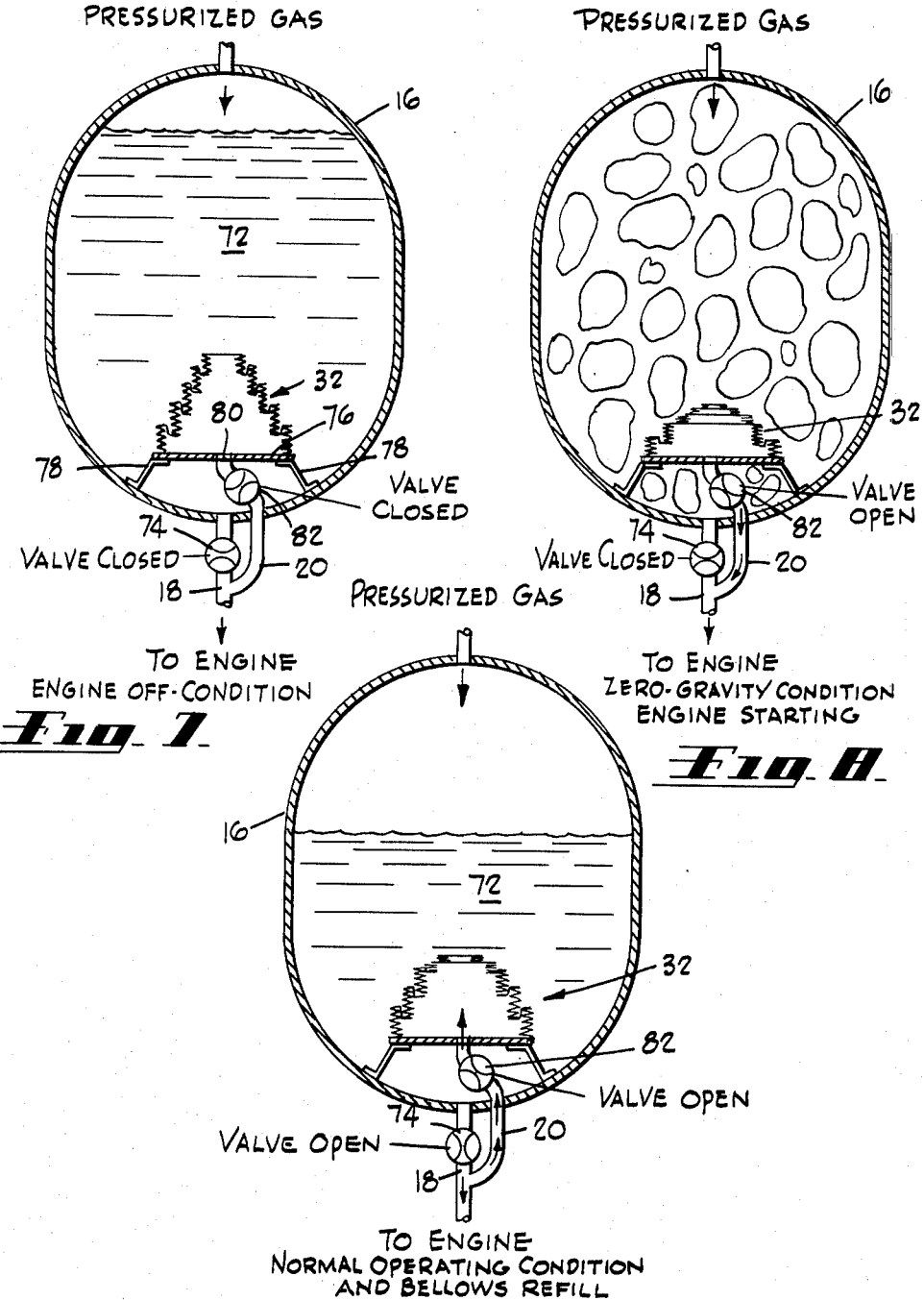

3,234,728
ZERO-GRAVITY PROPELLANT FEED SYSTEM
William D. Christian, Costa Mesa, and Glenn D.
Nesheim, Balboa Island, Calif., assignors, by mesne
assignments, to Douglas Aircraft Company, Inc.,
Santa Monica, Calif.
Filed Feb. 8, 1963, Ser. No. 257,272
6 Claims. (Cl. 60—35.3)

This invention relates to positive expulsion propellant storage tanks and more particularly to tanks for supplying propellant under the zero-gravity conditions of outer space.

The operation of self propelled vehicles in outer space presents many difficult problems, one of the most difficult being the storage and transfer of liquids such as propellants and other cryogenic or corrosive fluids. In fact, the problem exists even with such fluids as water. In the field of the earth's gravity, and particularly at present day altitudes of aircraft operation, the force of gravity is sufficient to keep liquids in a collected or settled state at the bottom of a tank and they can be withdrawn by pumps. At the higher altitudes where barometric pressure is low and pumps are troubled with vapor lock, air or gas under pressure can be introduced in the tank above the liquid to force it out of the tank through a transfer conduit. This simple system fails in outer space where the liquid and the gas are both weightless and intermingle freely with the result that the gas is just as likely to issue through the exit port as the desired liquid.

This difficulty has been overcome to some extent in present day space vehicles by providing pressurizable containers of a desired size and placing within them flexible bladders of rubber or plastic which are of substantially the same volume as the interiors of the containers. These bladders are connected to the transfer conduits which are sealed off from the containers and are initially charged with whatever fluid it is desired to carry. The containers are connected to a source of gas under pressure which enters between the containers and the outer walls of the bladders to collapse them and expel their contents. Thus the gas and liquid are kept separate and the latter is delivered undiluted for its intended use.

While these plastic bladders operate as described above they have several serious limitations which greatly reduce their reliability. One of these limitations is the degradation of the physical properties of the material with accumulated radiation dosage experienced in deep space flight. In addition, currently available bladders exhibit an undesirable degree of permeability to the propellants which are stored therein and show some degradation in properties on becoming saturated. Some polymer type bladders are less permeable but they are heavier and less flexible and tend to crease and tear on collapse in the expulsion cycle. Flexibility is also greatly decreased by cryogenic temperatures. Usually the bladders can be collapsed only once or very few times and this seriously limits pre-flight checkout procedures when it is desired to cycle the system many times in order to insure the operability, or reliability, of all components.

The fluid expulsion system of the present invention overcomes all of these difficulties in a simple and practical manner and provides the complete reliability which is so essential in deep space operations. In general it includes a container in the form of a hollow shell which is preferably dome like, a generally planar cross-member extending across the open end of the shell, and a metallic bellows within the shell. The bellows is made up of a plurality of convolutions of varying sizes, the largest being adjacent the cross-member and the sizes decreasing as they become more remote from it. The sizes and numbers are so chosen that when the bellows is expanded it takes a form approximating that of the interior of the shell and when it is completely collapsed the convolutions lie generally in a common plane against the cross-member.

The interior of the bellows communicates with a point at or close to the junction of the shell and cross-member where a fitting is adapted to be connected to a transfer conduit. A fitting is provided on the shell, preferably near the peak of the dome, for connection to a source of pressurizing gas which enters between the shell and the bellows. The latter is secured in a fluid-tight manner to either the shell or the cross-member or both to form a barrier between the interior and exterior of the bellows. When a valve in the transfer conduit is opened the pressurizing gas collapses the bellows and ejects the fluid. The operation may be intermittent or continuous until the convolutions are tight against the cross-member when all but a very minor proportion of the contents is expelled. With careful design the expulsion efficiency has been found to be as high as ninety-nine percent.

Normally two shells are joined by a single cross-member to form a generally spherical container with a partition in the center and a bellows in each shell. When it is desired to carry fuel and oxidizer in one container the cross-member is imperforate and there are separate outlets for each bellows. When only a single substance is to be carried the cross-member or partition may be a perforated plate or a woven wire screen or other suitable construction which will provide access for the fluid from the bellows to the outlet port or ports.

While the bellows may be of the corrugated type it is preferred to construct it of a series of substantially flat rings joined at alternate edges to accomplish more complete collapse and expulsion of fluid. With modern materials and manufacturing techniques this construction is remarkably free from fatigue failures. In one form most or all of the pairs of rings are graduated in diameter to closely fit the outline of the shell and to lie quite flat on the partition or cross-member. In the presently preferred form, however, a first set or stack of rings is made of substantially constant inside and outside diameters, the expanded height of the set being about fifteen to twenty percent of the height of the shell from the partition line. The second set has an outside diameter somewhat smaller than the inside diameter of the first set so as to nest there-within and is secured thereto by an adapter ring.

The latter is Z-shaped in cross-section radially of the bellows. The outer band of the adapter ring is secured to the outermost convolution of the first set and the intermediate web extends inwardly in cylindrical form within the first set and has a height substantially equal to the height of the set when fully collapsed. The inner band is secured to the innermost convolution of the second set. With this construction both sets can bottom on the partition when fully collapsed. Succeeding sets are made smaller and secured together in the same way. There is also a gradual reduction in the number of rings per set and a gradual widening of the rings to produce a dome shaped envelope to fit the shell and to collapse into a substantially common plane.

The bellows is metallic throughout and is made of a material suited to the nature of the substance to be stored. Stainless steel, aluminum, and titanium alloys are satisfactory for the various substances presently being encountered. The shells and cross members are normally of the same materials. A system constructed as above described will store and expel as much propellant or other fluid as the best system using plastic bladders. It is not subject to deterioration by radiation and is completely impermeable to the contents and not affected by their nature. In addition it can be cycled innumerable times without fatigue or other failure and thus removes the limitation on checkout procedures.

The bellows is also useful in starting engines in a zero-gravity environment when the propellant tank contains a weightless mixture of pressurizing gas and propellant. A small bellows previously charged with undiluted fluid is located within the tank and has an auxiliary valved conduit connected to the main propellant transfer line downstream of the main line valve. When it is desired to start the engine the main valve is closed and the auxiliary valve is opened. Since the bellows is pressurized by the gas in the tank it collapses and feeds undiluted propellant to the engine. After the engine is started, the propellant in the tank is settled and collected at the bottom of the tank by the force of acceleration of the vehicle and the main valve is opened. Undiluted propellant is now fed from the tank to the engine and also back through the auxiliary line to the bellows. When the latter is again fully charged, the auxiliary valve is closed and the bellows is again ready for a starting operation.

Various other advantages and features of novelty will become apparent as the description proceeds in conjunction with the accompanying drawings in which:

FIG. 3 is a fragmentary elevational view similar to FIG. 2 but with an idealized representation of the cross-section of the bellows shown in phantom lines;

FIG. 7 is a sectional view in elevation of a main propellant tank substantially full of liquid propellant in normal gravity environment with auxiliary bellows full, all valves closed, and engine off;

FIG. 8 is a similar view with the propellant and pressurizing gas intermingled in zero-gravity environment with the auxiliary valve open to feed undiluted propellant from the bellows to the engine for restarting; and FIG. 9 is a similar view in acceleration environment with both valves open to feed undiluted propellant from the main tank to the engine and to the bellows.

Figures 1, 2:
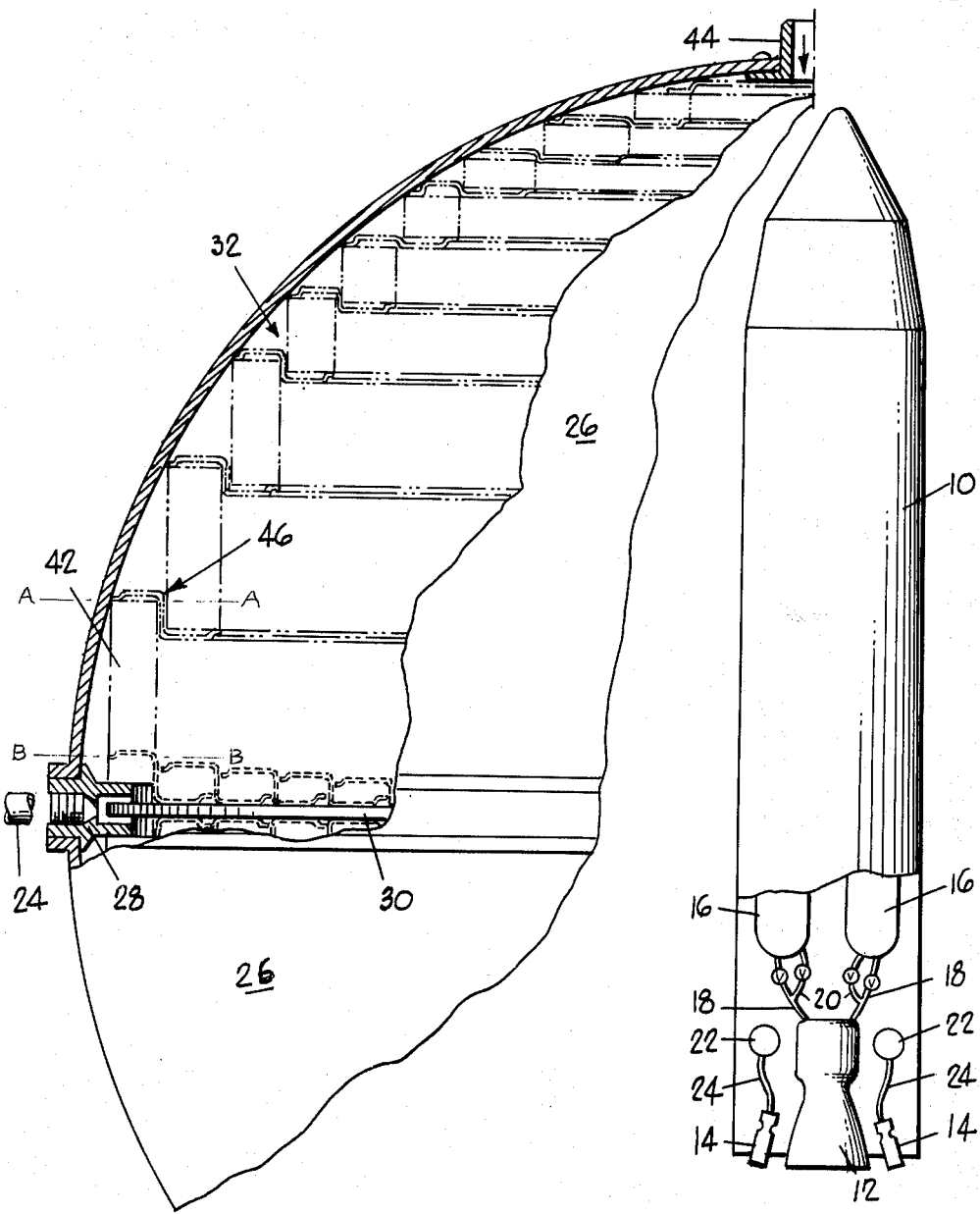
FIG. 1 is a schematic view in elevation of a rocket equipped with main and auxiliary engines and propellant supply systems therefor.
FIG. 2 is an elevational view of a supply tank with a portion of the wall broken away to show the bellows contained therein.

A rocket which might advantageously utilize the invention in one of its forms is shown in a generalized manner in FIG. 1, in which the main body or casing 10 is open at the rear for placement and operation of main thrust engine 12 and auxiliary engines 14 which may be used for steering or other purposes. Engine 12 is fed with a mixture of propellant fluids from main tanks 16 through main conduits 18 in normal operation. If the engine is stopped and must be re-started in zero gravity environment, fluids are fed through auxiliary conduits 20 from auxiliary tanks, not shown, in a manner to be described later. The auxiliary engines 14 are fed from tanks 22 through conduits 24.

Tank 22 as seen in FIG. 2 comprises a generally spherical container made up of hollow dome-like shells 26, a cross-member or partition including mounting ring 28 and planar member 30, and a bellows 32 in each shell. The mounting ring is provided with annular shoulders 34 which in effect provide the ring with a peripheral mounting flange to which flanges 36 of the shells are secured by welding or other suitable means. The ring is provided with a fitting 38 for connection to conduit 24. Planar member 30 may be a flat plate as shown and is seated in an annular groove in the inner periphery of ring 28. A radial bore 40 extends through the ring in alignment with fitting 38 and communicates with the interiors of the bellows 32. Since they are both in communication with the same port, member 30 may be perforated or may even be a woven wire mesh. If different fluids are to be stored in the respective bellows a portion of bore 40 can be plugged or it can be formed to communicate with only one bellows. In such case a second port 38 and communicating bore can be located at another point.

Each bellows is made up of a plurality of convolutions decreasing in diameter as they become more remote from the mounting ring. In the form shown, a first stack or set 42 is made up of several convolutions of constant size to make a generally cylindrical section substantially filling the portion of the shell which is most nearly cylindrical, and its expanded height may be about fifteen to twenty percent of the height of the shell. Succeeding similar sections are of generally lesser height and diameter, with the uppermost convolution incorporating a plate like closure. It will be seen that the numbers and sizes of the convolutions are selected so that the whole assembly when expanded approximates the size and shape of the interior of the shell to give it substantially the same storage capacity.

The base ring of the bellows may be secured by welding or otherwise to the mounting ring as shown or it may be secured to the base of the shell adjacent the mounting ring, or both. In any event, the connection is made fluid-tight so that it serves as a barrier between the interior and exterior of the bellows. Another fitting 44 is provided, preferably at the peak of each shell, to provide for introduction of pressurizing gas into the space between the shell and the bellows. When the contents of the bellows are to be expelled the pressure of the gas will collapse the bellows.

Figure 4:
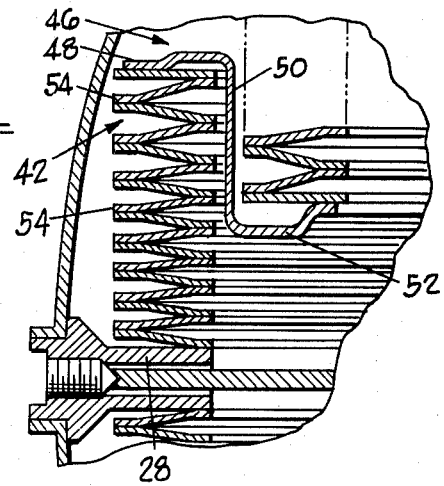
FIG. 4 is a detailed sectional view of portions of adjacent bellows sections in expanded condition.
Figure 5:
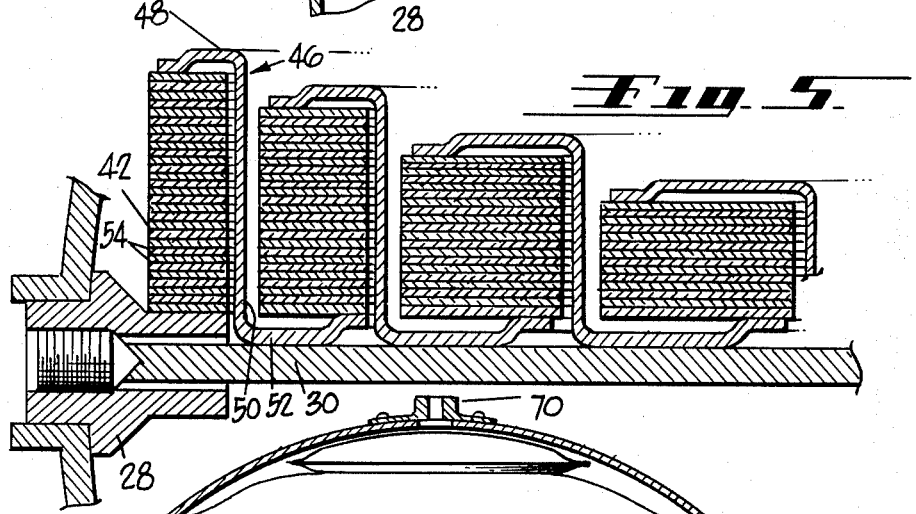
FIG. 5 is a similar view showing the bellows section in collapsed condition.

The detailed structure of the bellows and the manner in which complete collapse is accomplished are illustrated in FIGS. 3, 4, and 5. Stack or set 42 of the bellows has an extent A—A when expanded and an extent B—B when fully collapsed, as indicated in FIG. 3. Each succeeding set is nested within the preceding one and is attached thereto by an adapter ring 46, and has corresponding expanded and collapsed extents. Each ring 46 comprises an outer annular, substantially planar band 48, an intermediate generally cylindric web 50 slightly smaller than and nesting within its respective bellows section and extending axially inwardly, and an inner annular, substantially planar band 52 extending radially inwardly. Each intermediate web is slightly longer than the axial height of its associated collapsed set of convolutions.

As best seen in FIGS. 4 and 5, the convolutions of the bellows are made up of annular, generally planar rings 54 secured adjacent their peripheral edges to preceding and succeeding rings. The dimensions of the elements are greatly exaggerated for clarity of illustration, the actual thickness of the material generally ranging from three to ten thousandths of an inch, although it is not so limited. The innermost, or base, ring is secured to the mounting ring 28 in the presently preferred embodiment. When the bellows is collapsed, as in FIGS. 3 and 5, it will be seen that the Z-ring is just long enough axially to rest on plate 30 and each successive Z-ring is similarly proportioned to its corresponding set of convolutions. Consequently upon complete collapse the various sets of convolutions all rest on the partition 30 in a generally common plane and nest closely in a radial sense so that the voids between them are minimized. The total void volume can be held to about one percent of the total volume of the expanded bellows so that the explusion efficiency is ninety-nine percent.

Figure 6:
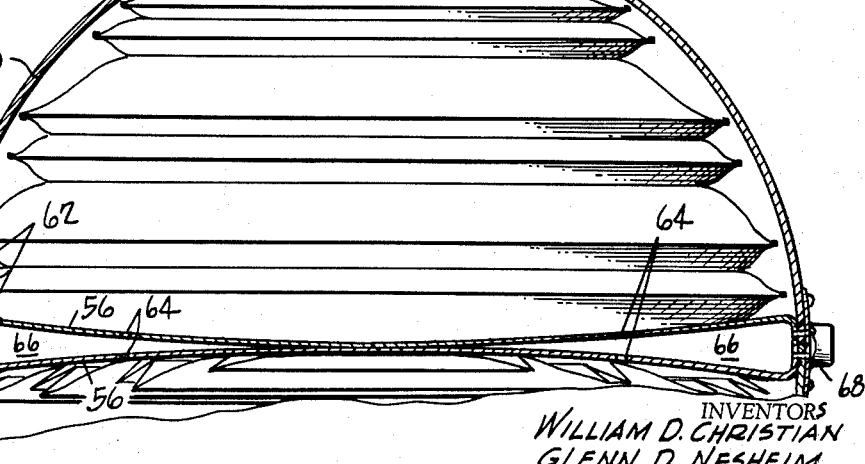
FIG. 6 is a schematic sectional view of a portion of a modified form of the invention.

A modified form of the invention is shown in FIG. 6 in which the partition is made of a pair of dished plate members 56 provided with peripheral flanges 58 extending toward each other and joined at their meeting edges by welding or the like. The shells 60 overlie flanges 58 and are secured thereto and to each other by welding or the like. The bellows is made up of a comparatively small number of annular rings 62 almost all of which are gradually reduced in outside diameter. Only the largest diameter rings are in sets and there are only a few convolutions in each set.

As before, the rings are joined at their edges by welding or other suitable means and the base ring is suitably secured to the partition. When expanded, the bellows has approximately the dome shape of the shell and when collapsed it lies against one of the partition members 56 as shown. Apertures 64 provide communication from the interior of the bellows to the annular space 66 between the partition members. A fitting 68 communicates with space 66 and is adapted to be connected to a suitable fluid conduit.

The bellows on the opposite side of the partition is constructed in the same way as the one above described and communicates with the same space and fitting. If desired, space 66 can be divided by a diaphragm and the two bellows can communicate with separate fittings so that different liquids may be stored in the same tank. As in the previously described construction a fitting 70 is provided on each shell, usually at the peak of the dome, for the introduction of pressurizing gas between the shell and the bellows to collapse the latter and expel the contents.

The novel bellows is also used to advantage in systems for supplying propellant to the main engine of a rocket or space vehicle wherein the main tanks contain liquid propellant and pressurizing gas without an impervious barrier between them. Such a system is illustrated in FIGS. 7, 8 and 9, in which tank 16 contains liquid propellant 72 directly exposed to the pressurizing gas. FIG. 7 represents the condition in a normal gravity field or environment with the tank in an upright position corresponding to the upright position of the vehicle, the rear of the tank and vehicle being at the bottom as seen in this figure and in FIG. 1. It will be seen that gravity causes the propellant to collect and settle at the bottom of the tank, and the gas rises to the top.

Main line or conduit 18 is connected to the bottom or rearmost part, of the tank and extends to the engine. Flow through this line is controlled by main valve 74 which is shown closed in FIG. 7, representing engine-off condition. Bellows 32, constructed in the same way as in FIGS. 2, 3, 4, and 5 is mounted on plate 76 which is carried by brackets 78. The plate is imperforate except for port 80 connected to the auxiliary line or conduit 20 which joins line 18 downstream of valve 74. The auxiliary line is provided with an auxiliary valve 82. The bellows is, of course, secured to plate 76 in a fluid-tight manner. In this figure the bellows is fully charged with liquid propellant and valve 82 is closed to prevent outflow. The pressure of the gas in tank 16 is applied to the bellows to collapse it and expel the contents when desired.

It will be noted that in the form illustrated in these figures the bellows 32 and plate 76 are well spaced from the wall of tank 16. This is important when cryogenic fluids are involved because heat transfer from the wall of tank 16 to the bellows would cause "boil-off," requiring a vapor bent valve to avoid excessive pressure rise. In the present construction the bellows is substantially isolated from the tank wall and surrounded by cryogenic fluid whose "boil-off" will maintain the necessary low temperature of the bellows contents and eliminate the need for a vent valve for the bellows. Since the brackets 78 are also immersed in the cryogenic fluid the small quantity of heat they pick up from the wall is rejected into the fluid before it reaches the bellows.

FIG. 8 illustrates the condition in a zero-gravity field. Since the propellant and gas are now weightless they become thoroughly mixed as shown and either one may enter line 18. To start and operate the engine properly it is necessary to have a supply of undiluted propellant and hence the main supply cannot be used. Therefore the auxiliary valve 82 is opened as shown and undiluted propellant flows through line 20 and into line 18 downstream of valve 74. The engine can therefore be started and run for a limited time. As soon as the engine is in operation it accelerates the vehicle and the acceleration force acts in the same manner as gravity to collect and settle the propellant at the bottom or rear of the tank.

This latter condition is illustrated in FIG. 9. As soon as the propellant is settled, valve 74 is opened and undiluted propellant under pressure now flows to the engine directly from the main tank. The bellows is designed and built so that its own spring constant will act to normally maintain an expanded condition and this can be aided by spring means within the bellows if necessary or desirable. Consequently the pressurized fuel in line 18 will flow up through line 20 and recharge the bellows, which will automatically extend to full expanded condition, after which valve 82 is closed and the bellows is ready for use in starting the engine again if the occasion arises.

The novel tank system herein described has various uses other than those specifically outlined above. In manned vehicles the compartment pressure and temperature are controlled largely by the controlled release and expansion of liquid nitrogen to form a cold gas. This of course is a cryogenic fluid and the novel tank system of this invention is ideal for storing the fluid and for releasing it automatically or "on demand." It is also suitable for storing and dispensing drinking water, soups, and other sustenance fluids, and may even be utilized in machines for reclaiming bulk and/or food values from waste products.

It will be apparent to those skilled in the art that various changes and modifications may be made in the construction and arrangement of parts as disclosed without departing from the spirit of the invention and it is intended that all such changes and modifications shall be embraced within the scope of the following claims.

We claim:

1. A propellant expulsion system for use in zero-gravity environment comprising: a pressurizable container in the form of a hollow shell; a support member within said shell; a bellows mounted on said support member and being expansible to contain propellant and collapsible to expel propellant; a conduit connected to said shell for transfer of propellant therefrom to an engine; the point of connection being selected to be at the bottom of the shell in normal-gravity environment and at the rear of the shell in forward accelerating zero-gravity environment; a valve in said conduit; a second conduit connected at one end to said bellows and at the other end to said first conduit downstream of said valve; an independently operated valve in said second conduit; and means carried by said shell providing for introduction of a pressurizing gas into said shell to apply expulsion pressure to said bellows and to the propellant in said shell; said bellows, upon opening of its associated valve, being adapted to supply undiluted propellant in zero-gravity environment to start an engine and accelerate a space craft; and said shell upon opening of the first mentioned valve, being adapted to supply undiluted propellant in normal-gravity environment and in accelerating zero-gravity environment.

2. A method of supplying propellant to start and continue operation of a rocket engine of a space vehicle in a zero-gravity environment from a system including a tank containing mixed propellant and pressurizing gas, a collapsible bellows within the tank charged with undiluted propellant, a main propellant conduit connected to the rear of the tank with respect to forward acceleration, a valve in the main propellant conduit, an auxiliary propellant conduit connected at one end to the bellows and at the other end to the main propellant conduit downstream of said valve, and a second valve in said auxiliary propellant conduit, said method comprising: pressurizing the exterior of said bellows with the mixed propellant and pressurizing gas in said tank; opening said second valve; collapsing said bellows to cause propellant to flow to said engine, accelerating the vehicle by operation of said engine and settling the propellant in the rear of said tank, opening said first valve to cause fluid to flow from said tank to said engine and also to flow through said auxiliary conduit to recharge said bellows; and closing said second valve after said bellows has been recharged for use in a subsequent starting operation.

3. A propellant expulsion system comprising: a pressurizable propellant container in the form of a hollow shell; a second, collapsible propellant container mounted within said first container; a conduit connected to said shell for transfer of propellant therefrom; a valve in said conduit; a second conduit connected at its inner end to said second container and at its outer end to said first conduit downstream of said valve; an independently operated valve in said second conduit; and means carried by said shell providing for introduction of a pressurizing gas into said shell to apply expulsion pressure to said second container and to the propellant in said shell.

4. A propellant expulsion system as claimed in claim 3; said second container being spaced inwardly from the wall of said shell; and support means extending from the wall of said shell to said second container and offering a minimum heat transfer path; said support means being adapted to be immersed in fluid carried in said shell to reject substantially all of its heat to said fluid.

5. A propellant expulsion system as claimed in claim 3; said second container being biased to expand to maximum volume when subjected to substantially equal internal and external pressures.

6. A propellant expulsion system for use in zero-gravity environment comprising: a pressurizable main propellant container in the form of a hollow shell charged with diluted propellant fluid mixed with non-propellant gas; an auxiliary propellant container charged with undiluted propellant fluid and mounted within said shell and being expansible to contain propellant and collapsible to expel propellant; conduit means connecting said shell and auxiliary container for transfer of propellant therefrom to an engine; said conduit means being connected to said shell at a location at the rear of the shell in forward accelerating zero-gravity environment; means carried by said shell providing for introduction of a pressurizing gas into said shell to apply expulsion pressure to said auxiliary container and to the propellant in said shell; and valve means in said conduit means to communicate said auxiliary container with the engine to supply undiluted propellant in zero-gravity environment to start the engine and accelerate a space craft, and to communicate said shell with the engine to supply settled, undiluted propellant in accelerating zero-gravity environment.

References Cited by the Examiner
UNITED STATES PATENTS

| | | | |
|---|---|---|---|
| 731,354 | 6/1903 | Fulton | 92—34 X |
| 1,341,669 | 6/1920 | Porter | 103—148 |
| 1,698,164 | 1/1929 | Mallory | 92—34 X |
| 1,857,797 | 5/1932 | Van Ness | 222—95 X |
| 2,505,798 | 5/1950 | Skinner. | |
| 2,612,752 | 10/1952 | Goddard. | |
| 2,621,719 | 12/1952 | Eaton et al. | 158—50.1 |
| 3,032,984 | 5/1962 | Tweet | 60—35.6 X |
| 3,097,766 | 7/1963 | Biehl et al. | 60—39.48 X |
| 3,104,526 | 9/1963 | Hirschfeld et al. | 60—39.48 |

MARK NEWMAN, *Primary Examiner.*

SAMUEL LEVINE, *Examiner.*

D. HART, *Assistant Examiner.*